(12) United States Patent
Mizuta et al.

(10) Patent No.: US 7,114,946 B2
(45) Date of Patent: Oct. 3, 2006

(54) INJECTION MOLD

(75) Inventors: Yasushi Mizuta, Ibaraki (JP); Takashi Arai, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 10/649,834

(22) Filed: Aug. 28, 2003

(65) Prior Publication Data

US 2004/0043101 A1  Mar. 4, 2004

(30) Foreign Application Priority Data

Aug. 30, 2002  (JP) .............................. 2002-252428

(51) Int. Cl.
*B29C 45/83* (2006.01)

(52) U.S. Cl. .................... 425/542; 149/111; 149/114.1; 425/168; 425/547; 264/328.11

(58) Field of Classification Search ............ 249/114.1, 249/111; 425/542, 168, 547; 264/328.11
See application file for complete search history.

(56) References Cited

U.S. PATENT DOCUMENTS 4,225,109 A * 9/1980 Yotsutsuji et al. .......... 425/547
4,659,056 A * 4/1987 Michaud-Soret ............ 249/111
5,176,839 A * 1/1993 Kim ............................ 249/111
5,535,980 A * 7/1996 Baumgartner et al. ... 249/114.1

FOREIGN PATENT DOCUMENTS

JP   53-86754    7/1978
JP   9-262838    10/1997

* cited by examiner

*Primary Examiner*—Tim Heitbrink
(74) *Attorney, Agent, or Firm*—Fitzpatrick, Cella, Harper & Scinto

(57) ABSTRACT

An injection mold includes a sliding member having a partial cavity surface which forms part of a cavity surface, and an adjacent member having a partial cavity surface which forms part of the cavity surface. A sliding surface of the sliding member is guided by a sliding surface of the adjacent member and is linearly movable by a relative sliding distance. A portion from the partial cavity surface to the sliding surface of at least one of the sliding member and adjacent member is continuously coated with a heat insulating coat, and a range over which the sliding surface is coated with the heat insulating coat is so set as to exceed an end of the relative sliding distance, where an edge of the partial cavity surface of the adjacent member contacts with the sliding surface of the sliding member.

6 Claims, 16 Drawing Sheets

FIG. 14

| | ARRANGEMENT OF SLIDING MEMBER | ARRANGEMENT OF ADJACENT MEMBER | NUMBER OF TIMES OF INJECTION MOLDING BEFORE PEELING OCCURRED |
|---|---|---|---|
| EXAMPLE 1 | FIG. 1 | FIG. 1 | 10,000 OR MORE |
| EXAMPLE 2 | 〃 | FIG. 5 | 〃 |
| EXAMPLE 3 | 〃 | FIG. 6 | 〃 |
| EXAMPLE 4 | 〃 | FIG. 7 | 〃 |
| EXAMPLE 5 | 〃 | FIG. 10 | 〃 |
| EXAMPLE 6 | FIG. 4 | FIG. 1 | 〃 |
| EXAMPLE 7 | 〃 | FIG. 5 | 〃 |
| EXAMPLE 8 | 〃 | FIG. 6 | 〃 |
| EXAMPLE 9 | 〃 | FIG. 7 | 〃 |
| EXAMPLE 10 | 〃 | FIG. 10 | 〃 |
| EXAMPLE 11 | FIG. 8 | FIG. 1 | 〃 |
| EXAMPLE 12 | 〃 | FIG. 5 | 〃 |
| EXAMPLE 13 | 〃 | FIG. 6 | 〃 |
| EXAMPLE 14 | 〃 | FIG. 7 | 〃 |
| EXAMPLE 15 | 〃 | FIG. 10 | 〃 |
| EXAMPLE 16 | FIG. 9 | FIG. 1 | 〃 |
| EXAMPLE 17 | 〃 | FIG. 5 | 〃 |
| EXAMPLE 18 | 〃 | FIG. 6 | 〃 |
| EXAMPLE 19 | 〃 | FIG. 7 | 〃 |
| EXAMPLE 20 | 〃 | FIG. 10 | 〃 |

FIG. 15

| | ARRANGEMENT OF SLIDING MEMBER | ARRANGEMENT OF ADJACENT MEMBER | NUMBER OF TIMES OF INJECTION MOLDING BEFORE PEELING OCCURRED |
|---|---|---|---|
| EXAMPLE 21 | FIG. 5 | FIG. 1 | 10,000 OR MORE |
| EXAMPLE 22 | // | FIG. 5 | // |
| EXAMPLE 23 | // | FIG. 6 | // |
| EXAMPLE 24 | // | FIG. 7 | // |
| EXAMPLE 25 | // | FIG. 10 | // |
| EXAMPLE 26 | FIG. 6 | FIG. 1 | // |
| EXAMPLE 27 | // | FIG. 5 | // |
| EXAMPLE 28 | // | FIG. 6 | // |
| EXAMPLE 29 | // | FIG. 7 | // |
| EXAMPLE 30 | // | FIG. 10 | // |
| EXAMPLE 31 | FIG. 10 | FIG. 1 | // |
| EXAMPLE 32 | // | FIG. 5 | // |
| EXAMPLE 33 | // | FIG. 6 | // |
| EXAMPLE 34 | // | FIG. 7 | // |
| EXAMPLE 35 | // | FIG. 10 | // |
| COMPARATIVE EXAMPLE 1 | FIG. 12 | FIG. 12 | 13 |
| COMPARATIVE EXAMPLE 2 | FIG. 13 | FIG. 13 | 122 |

FIG. 16

| | PROTECTIVE COAT MATERIAL | COAT FORMATION METHOD | COAT THICKNESS | NUMBER OF TIMES OF INJECTION MOLDING BEFORE PEELING OCCURRED |
|---|---|---|---|---|
| EXAMPLE 36 | Ni-P | ELECTROLESS PLATING | ※ | ※ |
| EXAMPLE 37 | TiC | PHYSICAL VAPOR DEPOSITION | 1μm | 10,000 OR MORE |
| EXAMPLE 38 | TiN | PHYSICAL VAPOR DEPOSITION | // | // |
| EXAMPLE 39 | TiCN | CHEMICAL VAPOR DEPOSITION | // | // |
| EXAMPLE 40 | CrN | PHYSICAL VAPOR DEPOSITION | // | // |
| EXAMPLE 41 | ZrN | PHYSICAL VAPOR DEPOSITION | // | // |
| EXAMPLE 42 | SiC | CHEMICAL VAPOR DEPOSITION | // | // |
| EXAMPLE 43 | DIAMOND | CHEMICAL VAPOR DEPOSITION | // | // |
| EXAMPLE 44 | $Al_2N_3$ | CHEMICAL VAPOR DEPOSITION | // | // |

※ UNEVALUATED BECAUSE COAT THICKNESSES OF PORTION COATED WITH HEAT INSULATING COAT AND UNCOATED PORTION WERE NOT EVEN

INJECTION MOLD

FIELD OF THE INVENTION

The present invention relates to an injection mold in which at least a portion of the cavity surface is coated with a heat insulating coat, and which is used in plastic injection molding.

BACKGROUND OF THE INVENTION

As an injection mold having improved cavity surface transfer properties, an injection mold having a heat insulating structure (Japanese Patent Laid-Open No. 53-86754) is conventionally known. The surface transfer properties of this injection mold are improved by interposing a heat insulating material layer between a thin metal layer forming the cavity surface and a backing material, thereby decreasing the cooling rate of an injection-molded product during injection molding.

Unfortunately, the above prior art has the following unsolved problem.

An injection mold uses sliding members, such as an ejector pin, slide core, and inclined core, having partial cavity surfaces which form portions of the cavity surface. Each of these sliding members is slidably guided by the sliding surface of an adjacent member which is adjacent to this sliding member, and protruded into the cavity or retracted into the adjacent member, i.e., linearly moved. This linear motion is repeated for each molding cycle. Consequently, a load such as the frictional force is repetitively exerted on the edge of a heat insulating coat with which the sliding member or adjacent member is coated. This causes easy peeling of the heat insulating coat.

The edge of the heat insulating coat with which the sliding member or adjacent member is coated is formed by masking or machining. Therefore, the adhesion of the edge is lowered by a load generated when the masking material is peeled or when machining is performed. This presumably further promotes .peeling.

SUMMARY OF THE INVENTION

The present invention has been made in consideration of the unsolved problem of the above-mentioned prior art, and has as its object to provide an injection mold having high durability because a heat insulating coat with which at least one of a sliding member and adjacent member is coated has a high peeling resistance.

To achieve the above object, according to a first aspect of the present invention, there is provided an injection mold comprising a sliding member having a partial cavity surface which forms part of a cavity surface, and an adjacent member having a partial cavity surface which forms part of the cavity surface, a sliding surface of the sliding member being guided by a sliding surface of the adjacent member and linearly movable by a relative sliding distance, wherein a portion from the partial cavity surface to the sliding surface of at least one of the sliding member and adjacent member is continuously coated with a heat insulating coat, and a range over which the sliding surface is coated with the heat insulating coat is so set as to exceed the relative sliding distance.

According to a second aspect of the present invention, there is provided an injection mold comprising a sliding member having a partial cavity surface which forms part of a cavity surface, and an adjacent member having a partial cavity surface which forms part of the cavity surface, a sliding surface of the sliding member being guided by a sliding surface of the adjacent member and linearly movable by a relative sliding distance, wherein a portion from the partial cavity surface to the sliding surface of at least one of the sliding member and adjacent member is continuously coated with a heat insulating coat, a range over which the sliding surface is coated with the heat insulating coat is so set as to exceed the relative sliding distance, and an entire region from the heat insulating coat to the sliding surface is continuously coated with a protective coat.

According to a third aspect of the present invention, there is provided an injection mold comprising a sliding member having a partial cavity surface which forms part of a cavity surface, and an adjacent member having a partial cavity surface which forms part of the cavity surface, a sliding surface of the sliding member being guided by a sliding surface of the adjacent member and linearly movable by a relative sliding distance, wherein a portion from the partial cavity surface to the sliding surface of at least one of the sliding member and adjacent member is continuously coated with a heat insulating coat, and an entire region from the heat insulating coat to the sliding surface is continuously coated with a protective coat.

According to a fourth aspect of the present invention, there is provided an injection mold comprising a sliding member having a partial cavity surface which forms part of a cavity surface, and an adjacent member having a partial cavity surface which forms part of the cavity surface, a sliding surface of the sliding member being guided by a sliding surface of the adjacent member and linearly movable by a relative sliding distance, wherein at least a portion of the partial cavity surface of at least one of the sliding member and adjacent member is continuously coated with a heat insulating coat, and an entire region from the heat insulating coat to the sliding surface is continuously coated with a protective coat.

In the present invention having the above arrangements, even when the sliding member is repetitively linearly moved as it is guided by the adjacent member, a load such as the frictional force is not applied on the edge of the heat insulating coat with which at least one of the sliding member and adjacent member is coated. Since this increases the peeling resistance of the heat insulating coat, the durability of the injection mold improves.

Further objects, features and advantages of the present invention will become apparent from the following detailed description of embodiments of the present invention with reference to the accompanying drawings.

BRIEF DESCRIPTION OF THE DRAWINGS

FIGS. 1A and 1B illustrate an injection mold according to the first embodiment, in which FIG. 1A is a schematic partial sectional view showing the state in which a sliding member and adjacent member form a cavity surface, and FIG. 1B is a schematic partial sectional view showing the state in which the sliding member protrudes into the cavity by a relative sliding distance;

FIGS. 2A and 2B illustrate a modification of the injection mold according to the first embodiment, in which FIG. 2A is a schematic partial sectional view showing the state in which a sliding member and adjacent member form a cavity surface, and FIG. 2B is a schematic partial sectional view showing the state in which the sliding member is retracted into the adjacent member by a relative sliding distance;

FIGS. 3A and 3B illustrate another modification of the injection mold according to the first embodiment, in which FIG. 3A is a schematic partial sectional view showing the state in which a sliding member and adjacent member form a cavity surface, and FIG. 3B is a schematic partial sectional view showing the state in which the sliding member protrudes into the cavity by a relative sliding distance;

FIG. 14 is a view showing the number of times of injection molding before peeling occurred in each example;

FIG. 15 is a view showing the number of times of injection molding before peeling occurred in each example; and FIG. 16 is a view showing the number of times of injection molding before peeling occurred in each example.

DETAILED DESCRIPTION OF THE PREFERRED EMBODIMENTS

Preferred embodiments of the present invention will now be described in detail in accordance with the accompanying drawings.

Figure 1A:
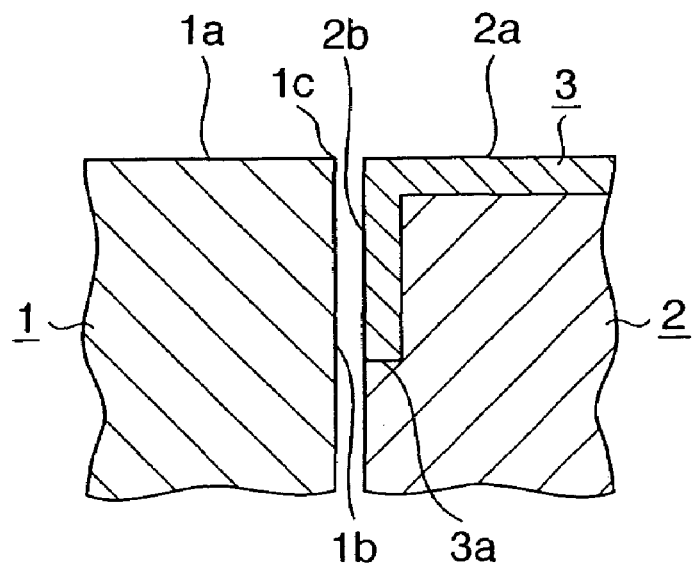
Figure 1B:
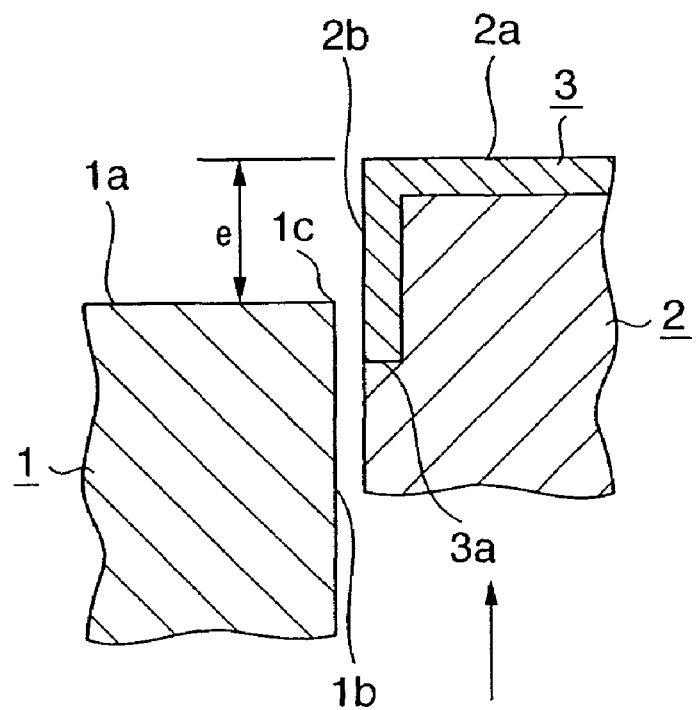

FIGS. 1A and 1B illustrate an injection mold according to the first embodiment, in which FIG. 1A is a schematic partial sectional view showing the state in which a sliding member and adjacent member form a cavity surface, and FIG. 1B is a schematic partial sectional view showing the state in which the sliding member protrudes into the cavity by a relative sliding distance.

As shown in FIGS. 1A and 1B, the injection mold according to this embodiment has an adjacent member 1 and sliding member 2 adjacent to each other. A sliding surface 2b of the sliding member 2 is slidably guided by a sliding surface 1b of the adjacent member 1 such that a partial cavity surface 2a of the sliding member 2 protrudes into the cavity by a relative sliding distance e from the state in which the partial cavity surface 2a is leveled with that partial cavity surface 1a of the adjacent member 1, which forms a portion of the cavity surface.

A portion from the partial cavity surface 2a to the sliding surface 2b of the sliding member 2 is continuously coated with a heat insulating coat 3. The range over which the sliding surface 2b is coated with the heat insulating coat 3 is so set as to exceed the relative sliding distance e.

In this embodiment, in the state in which the sliding member 2 protrudes into the cavity by the relative sliding distance e, a corner 1c between the partial cavity surface 1a and sliding surface 1b of the adjacent member 1 does not contact an edge 3a of the heat insulating coat 3 on the sliding surface 2b of the sliding member 2, so no overload is exerted on the edge 3a. This improves the peeling resistance of the heat insulating coat 3.

Figure 2A:
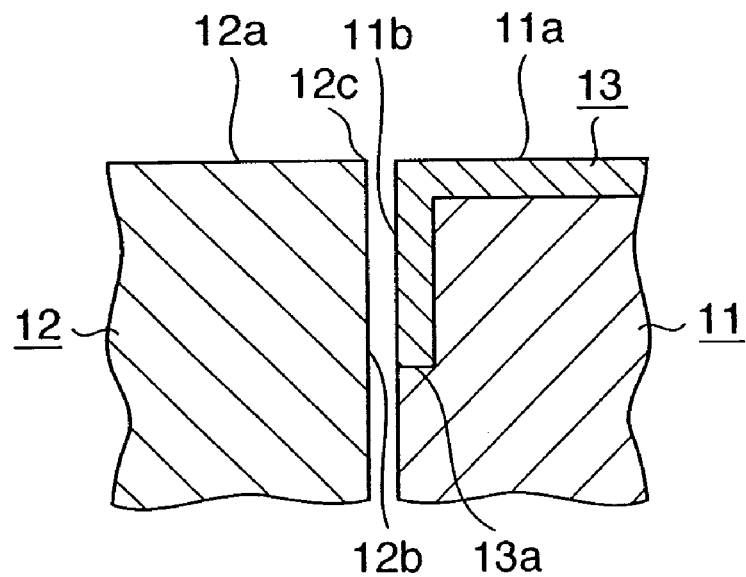
Figure 2B:
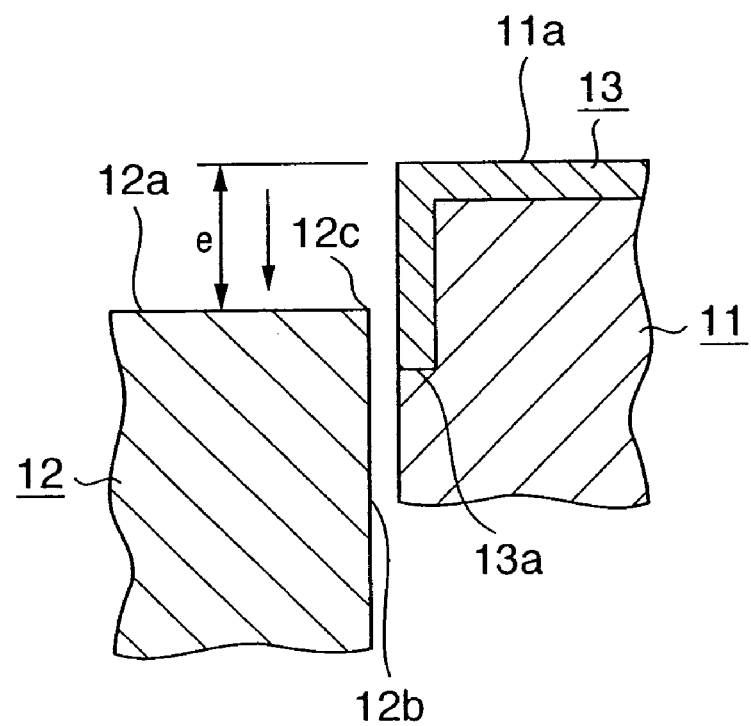

FIGS. 2A and 2B illustrate a modification of the injection mold according to the first embodiment, in which FIG. 2A is a schematic partial sectional view showing the state in which a sliding member and adjacent member form a cavity surface, and FIG. 2B is a schematic partial sectional view showing the state in which the sliding member is retracted into the mold body by a relative sliding distance.

As shown in FIGS. 2A and 2B, the injection mold according to this modification has an adjacent member 11 and sliding member 12 adjacent to each other. A sliding surface 12b of the sliding member 12 is slidably guided by a sliding surface 11b of the adjacent member 11 such that a partial cavity surface 12a of the sliding member 12 is retracted into the adjacent member by a relative sliding distance e from the state in which the partial cavity surface 12a is leveled with that partial cavity surface 11a of the adjacent member 11, which forms a portion of the cavity surface.

A portion from the partial cavity surface 11a to the sliding surface 11b of the adjacent member 11 is continuously coated with a heat insulating coat 13. The range over which the sliding surface 11b is coated with the heat insulating coat 13 is so set as to exceed the relative sliding distance e.

In this modification, in the state in which the sliding member 12 is retracted into the adjacent member by the relative sliding distance e, a corner 12c between the partial cavity surface 12a and sliding surface 12b of the sliding member 12 does not contact an edge 13a of the heat insulating coat 13 of the adjacent member 11, so no overload is exerted on the edge 13a. This improves the peeling resistance of the heat insulating coat 13.

Figure 3A:
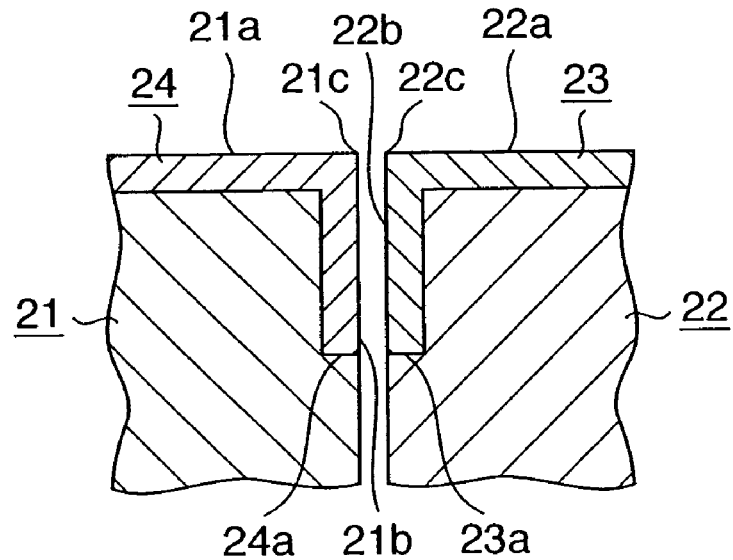
Figure 3B:
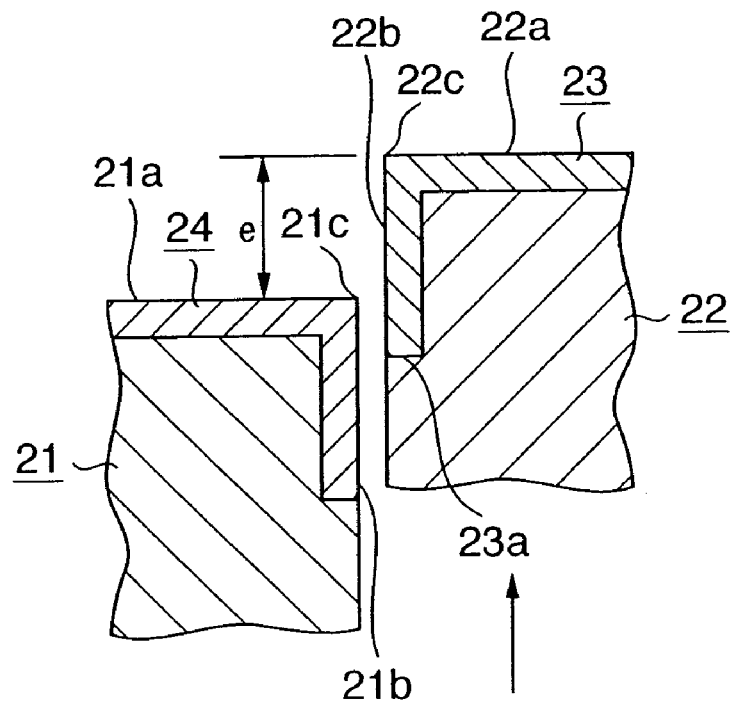

FIGS. 3A and 3B illustrate another modification of the injection mold according to the first embodiment, in which FIG. 3A is a schematic partial sectional view showing the state in which a sliding member and adjacent member form a cavity surface, and FIG. 3B is a schematic partial sectional view showing the state in which the sliding member protrudes into the cavity by a relative sliding distance.

As shown in FIGS. 3A and 3B, the injection mold according to this embodiment has an adjacent member 21 and sliding member 22 adjacent to each other. A sliding surface 22b of the sliding member 22 is slidably guided by a sliding surface 21b of the adjacent member 21 such that a partial cavity surface 22a of the sliding member 22 protrudes into the cavity by a relative sliding distance e from the state in which the partial cavity surface 22a is leveled with that partial cavity surface 21a of the adjacent member 21, which forms a portion of the cavity surface.

A portion from the partial cavity surface 22a to the sliding surface 22b of the sliding member 22 is continuously coated with a heat insulating coat 23. The range over which the sliding surface 22b is coated with the heat insulating coat 23 is so set as to exceed the relative sliding distance e. Also, a portion from the partial cavity surface 21a to the sliding surface 21b of the adjacent member 21 is continuously coated with a heat insulating coat 24. The range over which the sliding surface 21b is coated with the heat insulating coat 24 is so set as to exceed the relative sliding distance e.

In this modification, in the state in which the sliding member 22 protrudes into the cavity by the relative sliding distance e, a corner 21c between the partial cavity surface 21a and sliding surface 21b of the adjacent member 21 does not contact an edge 23a of the heat insulating coat 23 on the sliding surface 22b of the sliding member 22, so no overload is exerted on the edge 23a. This improves the peeling resistance of the heat insulating coat 23.

Note that the injection mold of this modification can also be so constructed that the sliding member 22 is retracted into the adjacent member as shown in FIGS. 2A and 2B. Even in this injection mold, in the state in which the sliding member 22 is retracted into the adjacent member by the relative sliding distance e, a corner 22c between the partial cavity surface 22a and sliding surface 22b of the sliding member 22 does not contact an edge 24a of the heat insulating coat 24 of the adjacent member 21, so no overload is exerted on the edge 24a.

Injection molds of other embodiments will be explained below by taking a sliding member as an example.

Figure 4:
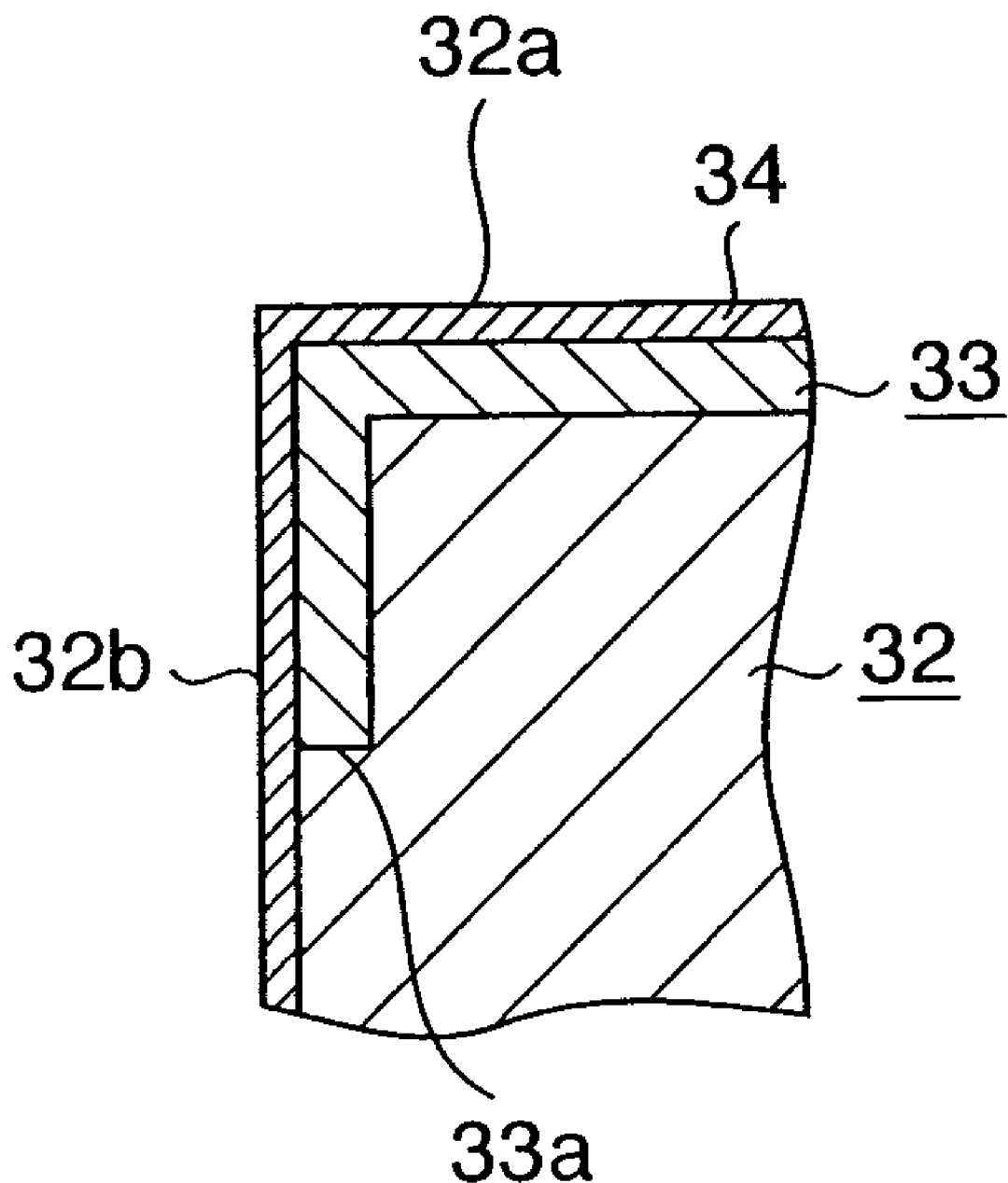
FIG. 4 is a schematic partial sectional view showing a sliding member of an injection mold according to the second embodiment.

FIG. 4 is a schematic partial sectional view of a sliding member of an injection mold according to the second embodiment. In the injection mold according to this embodiment, a portion from a partial cavity surface 32a to a sliding surface 32b of a sliding member 32 is continuously coated with a heat insulating coat 33. The range over which the sliding surface 32b is coated with the heat insulating coat 33 is so set as to exceed a relative sliding distance e. In addition, an entire region from the partial cavity surface 32a to the sliding surface 32b is continuously coated with a protective coat 34.

In this embodiment, a load such as the frictional force is not directly applied on the heat insulating coat 33. This makes the peeling resistance and durability higher than those of the injection mold according to the first embodiment.

Figure 5:
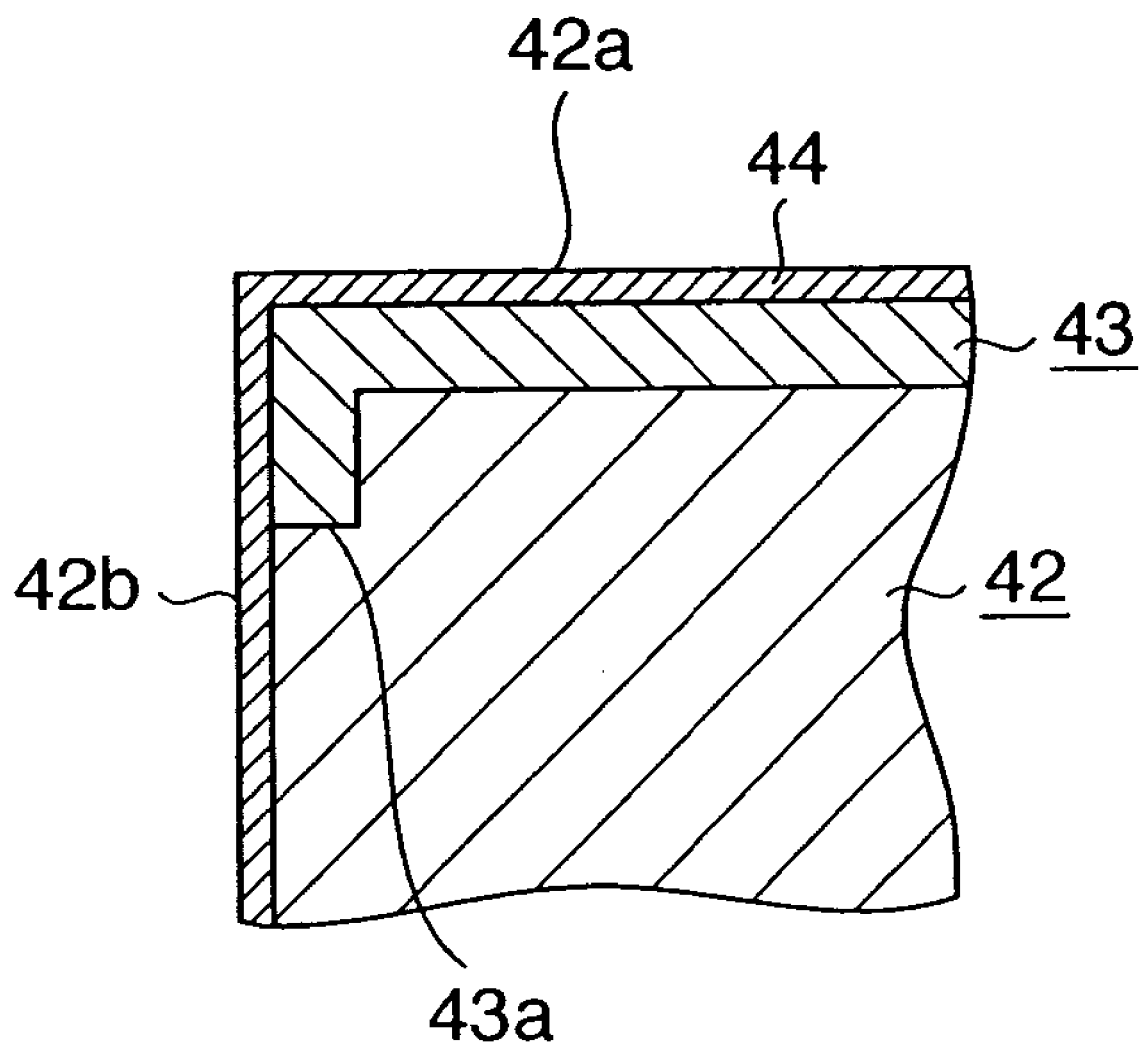
FIG. 5 is a schematic partial sectional view showing a sliding member of an injection mold according to the third embodiment.

FIG. 5 is a schematic partial sectional view of a sliding member of an injection mold according to the third embodiment. In the injection mold according to this embodiment, a portion from a partial cavity surface 42a to a sliding surface 42b of a sliding member 42 is continuously coated with a heat insulating coat 43. In addition, an entire region from the partial cavity surface 42a to the sliding surface 42b is continuously coated with a protective coat 44.

Figure 6:
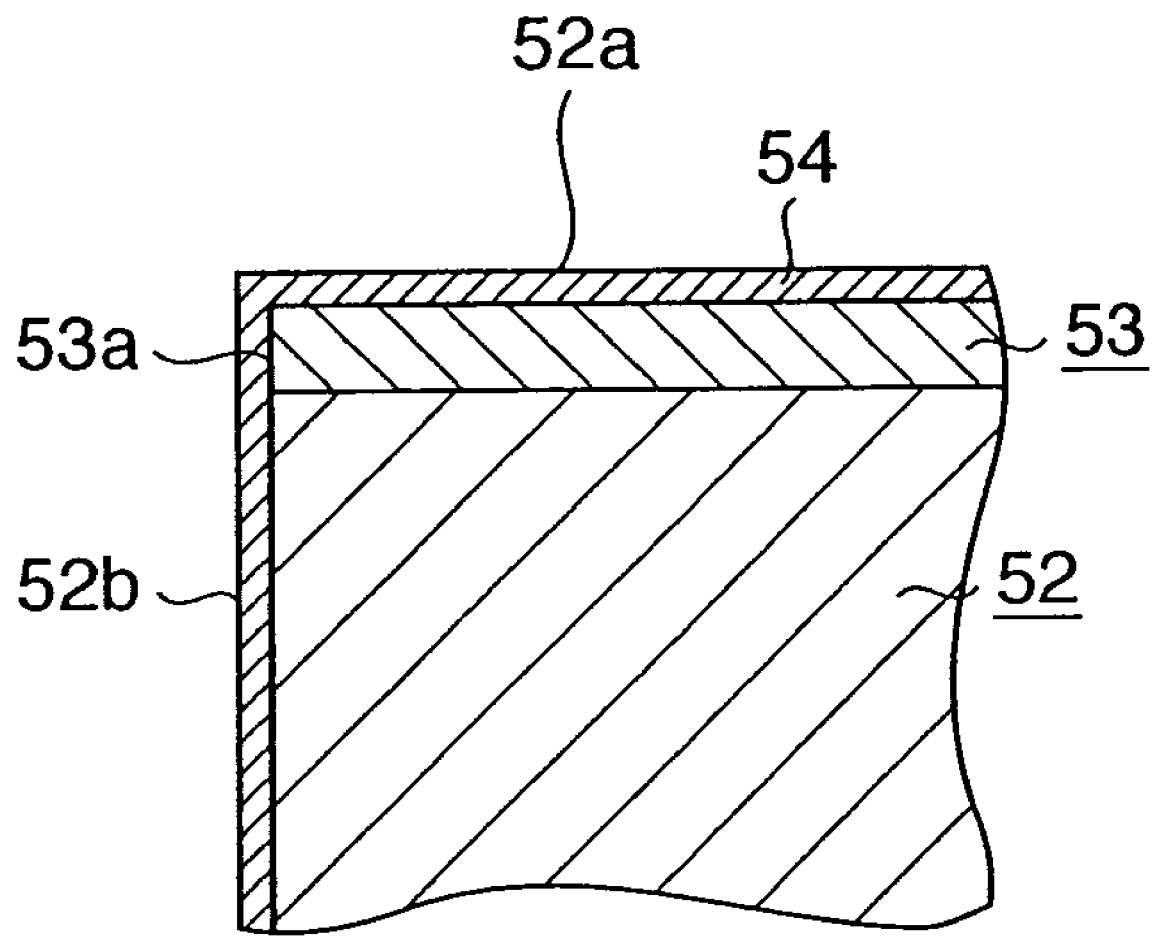
FIG. 6 is a schematic partial sectional view showing a sliding member of an injection mold according to the fourth embodiment.

FIG. 6 is a schematic partial sectional view of a sliding member of an injection mold according to the fourth embodiment. In the injection mold according to this embodiment, a partial cavity surface 52a of a sliding member 52 is continuously coated with a heat insulating coat 53. In addition, an entire region from the partial cavity surface 52a to a sliding surface 52b is continuously coated with a protective coat 54.

Figure 7:
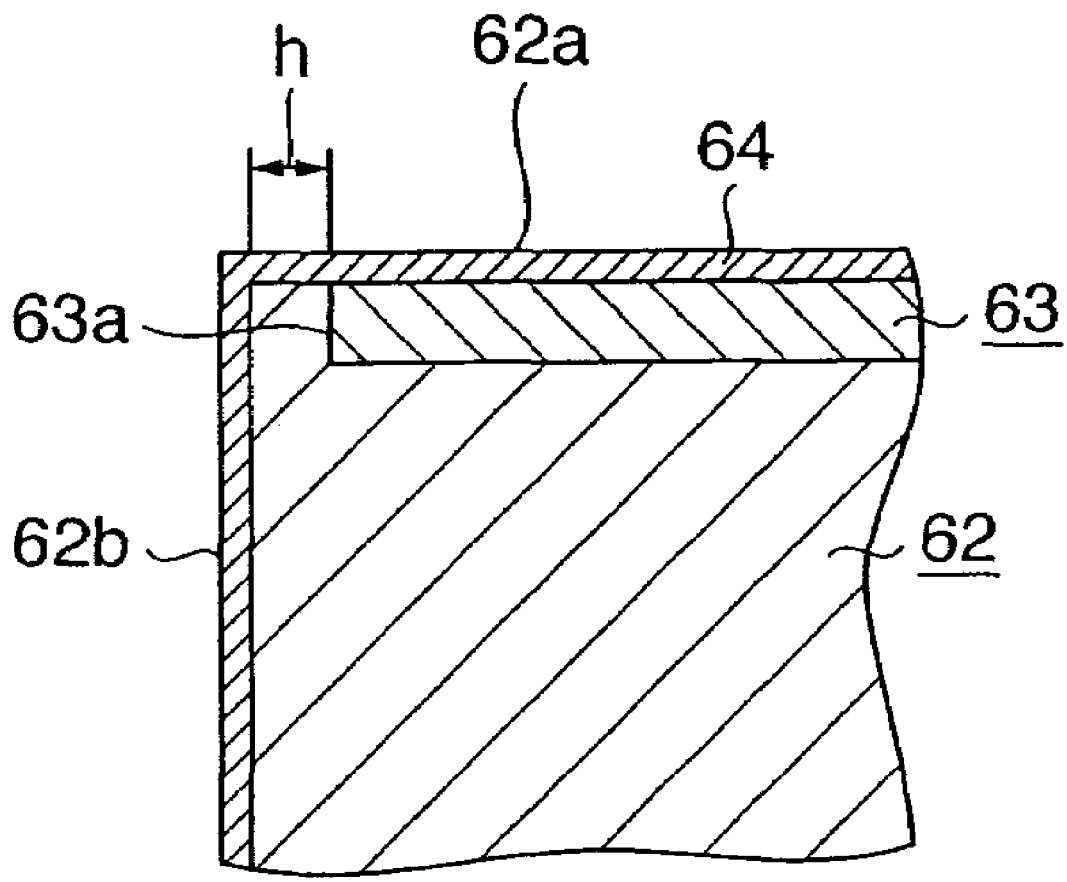
FIG. 7 is a schematic partial sectional view showing a sliding member of an injection mold according to the fifth embodiment.

FIG. 7 is a schematic partial sectional view of a sliding member of an injection mold according to the fifth embodiment. In the injection mold according to this embodiment, a partial cavity surface 62a except for a portion h near a sliding surface 62b of a sliding member 62 is continuously coated with a heat insulating coat 63. In addition, an entire region from the partial cavity surface 62a to the sliding surface 62b is continuously coated with a protective coat 64.

Figure 8:
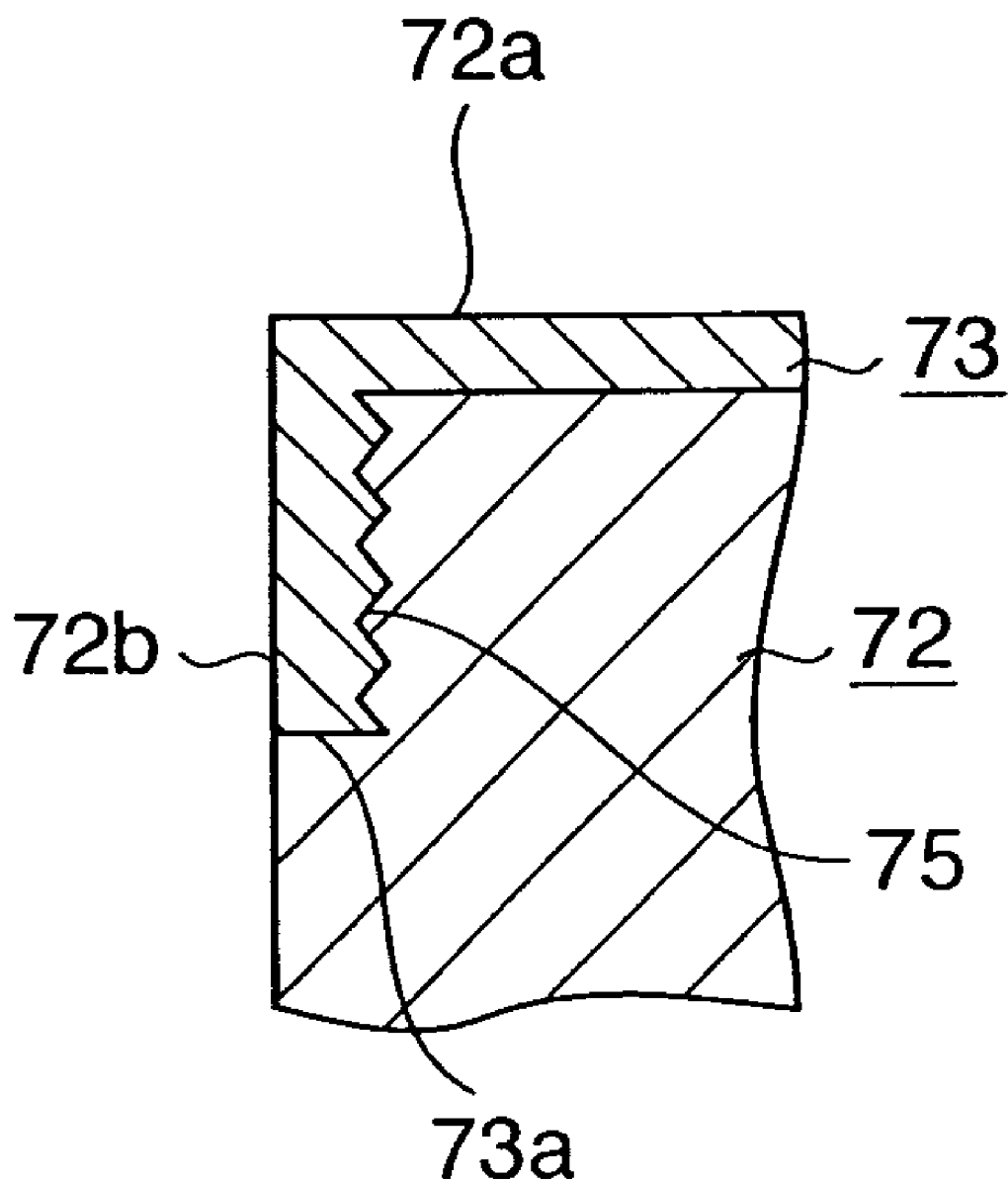
FIG. 8 is a schematic partial sectional view showing a sliding member of an injection mold according to the sixth embodiment.

FIG. 8 is a schematic partial sectional view of a sliding member of an injection mold according to the sixth embodiment. In the injection mold according to this embodiment, a portion from a partial cavity surface 72a to a sliding surface 72b of a sliding member 72 is continuously coated with a heat insulating coat 73. The range over which the sliding surface 72b is coated with the heat insulating coat 73 is so set as to exceed a relative sliding distance e (FIG. 1B). In addition, a jagged portion 75 is formed on that surface of the heat insulating coat, which opposes the sliding surface 72b. The sliding member 72 is strongly connected via the jagged portion 75.

Figure 9:
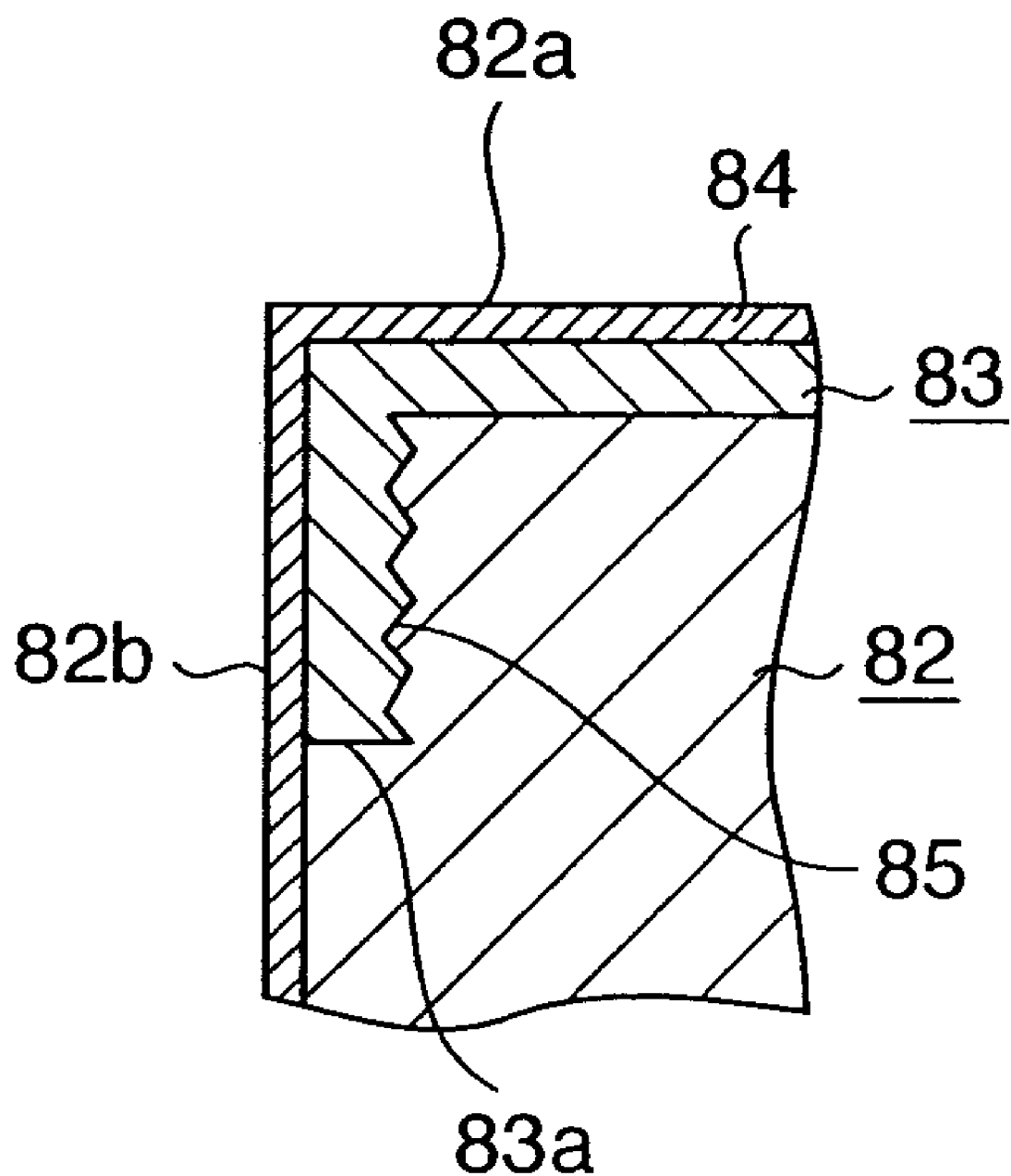
FIG. 9 is a schematic partial sectional view showing a sliding member of an injection mold according to the seventh embodiment.

FIG. 9 is a schematic partial sectional view of a sliding member of an injection mold according to the seventh embodiment. In the injection mold according to this embodiment, a sliding member 82 is continuously coated with a heat insulating coat 83 similar to that shown in FIG. 8. In addition, an entire region from a partial cavity surface 82a to a sliding surface 82b is continuously coated with a protective coat 84.

Figure 10:
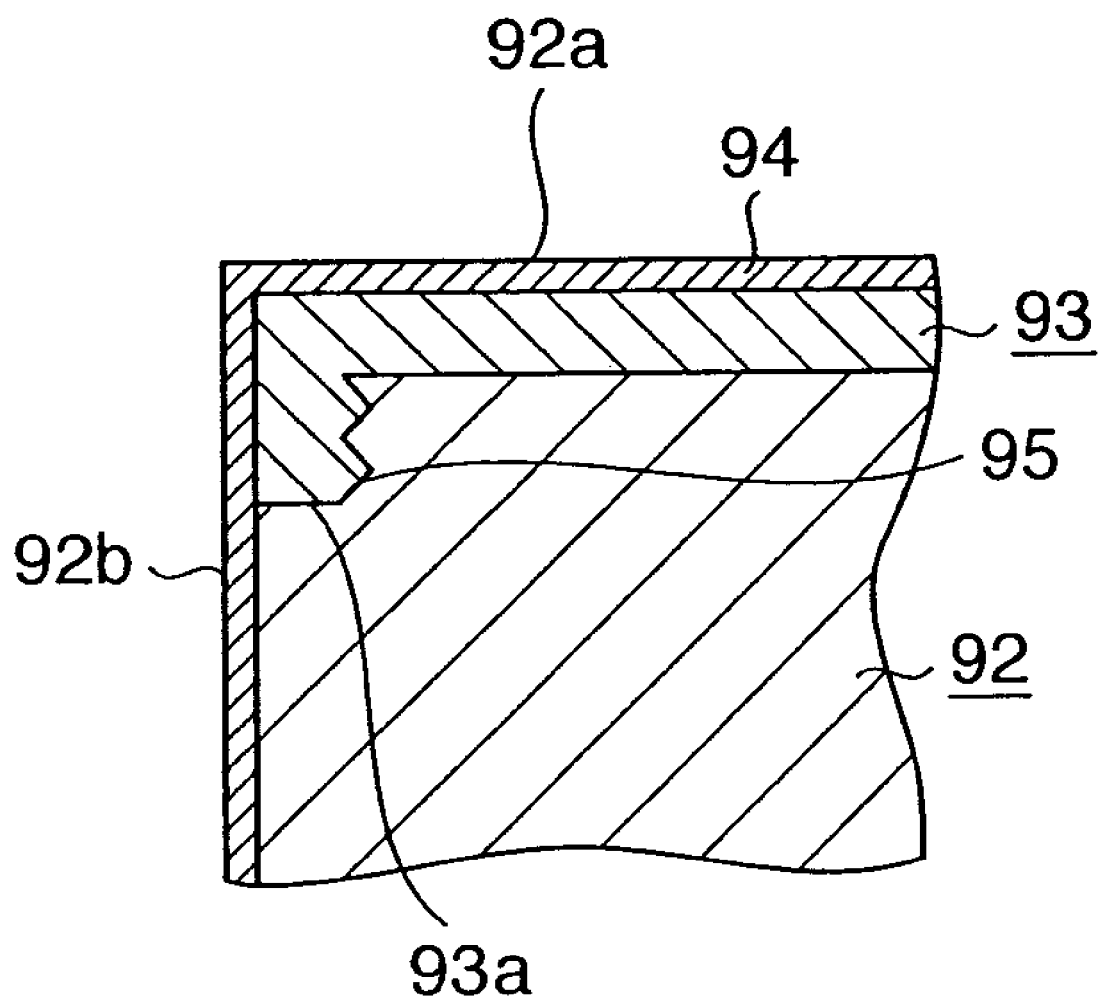
FIG. 10 is a schematic partial sectional view showing a sliding member of an injection mold according to the eighth embodiment.

FIG. 10 is a schematic partial sectional view of a sliding member of an injection mold according to the eighth embodiment. In the injection mold according to this embodiment, a portion from a partial cavity surface 92a to a sliding surface 92b of a sliding member 92 is continuously coated with a heat insulating coat 93. A jagged portion 95 is formed on that surface of the heat insulating coat 93, which opposes the sliding surface 92b. The heat insulating coat 93 is strongly connected to the sliding member 92 via the jagged portion 95. In addition, an entire region from the partial cavity surface 92a to the sliding surface 92b is continuously coated with a protective coat 94.

Figure 11:
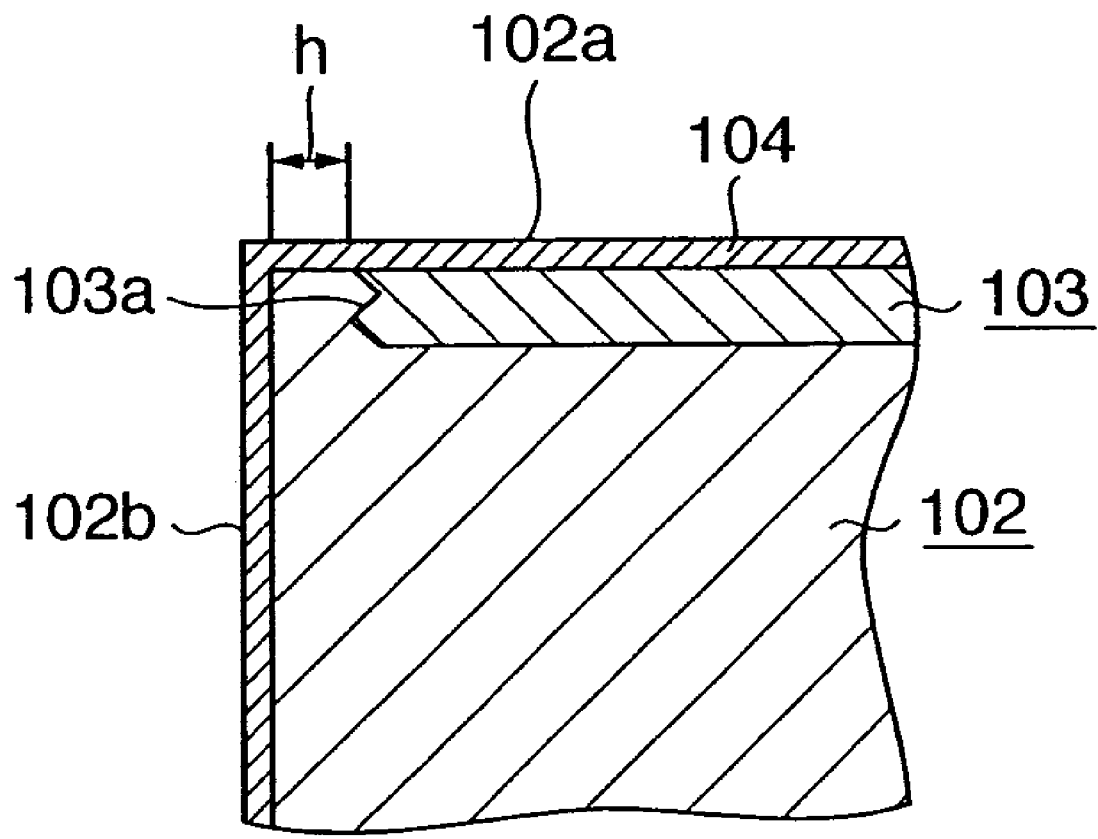
FIG. 11 is a schematic partial sectional view showing a sliding member of an injection mold according to the ninth embodiment.

FIG. 11 is a schematic partial sectional view of a sliding member of an injection mold according to the ninth embodiment. In the injection mold according to this embodiment, a partial cavity surface 102a except for a portion h near a sliding surface 102b of a sliding member 102 is continuously coated with a heat insulating coat 103. A jagged portion 103a is formed on that surface of the heat insulating coat 103, which opposes the sliding surface 102b. In addition, an entire region from the partial cavity surface 102a to the sliding surface 102b is continuously coated with a protective coat 104.

The above second to ninth embodiments are explained by taking the sliding member as an example. The adjacent member or the sliding member and adjacent member are similar to those shown in FIGS. 2A and 2B and FIGS. 3A and 3B as modifications of the first embodiment, so a detailed description thereof will be omitted.

In the present invention, a heat-resistant polymer material is preferably used as the heat insulating coat.

Also, the protective coat is preferably a single-layered coat or multilayered coat made of, e.g., a metal such as Ni, Ti, Cr, Zr, or Si, ceramics such as an oxide, carbide, or nitride of any of these metals, or diamond.

Experiments were conducted to confirm the effects of the injection molds according to the present invention. The results of these experiments will be explained below.

EXPERIMENTAL EXAMPLE 1

An injection mold having an ejector pin as a sliding member was used in injection molding an injection molding product by changing the combination of the arrangement of the ejector pin and the arrangement of an adjacent member, and the number of times of injection molding before a heat insulating coat peeled was checked. The results are shown in FIGS. 14 and 15.

Note that as the arrangement of the sliding member and the arrangement of the adjacent member in Examples 1 to 35 shown in FIG. 14, the arrangements of the sliding members shown in FIGS. 1, 4, 5, 6, 7, and 10 were used.

Note also that in each of Examples 1 to 35, a 0.1 mm thick polyimide vacuum deposited polymerized coat (manufactured by VACUUM METALLURGICAL CO., LTD.) was used as the heat insulating coat, and a 0.001 mm thick CrN coat was used as the protective coat.

Figure 12:
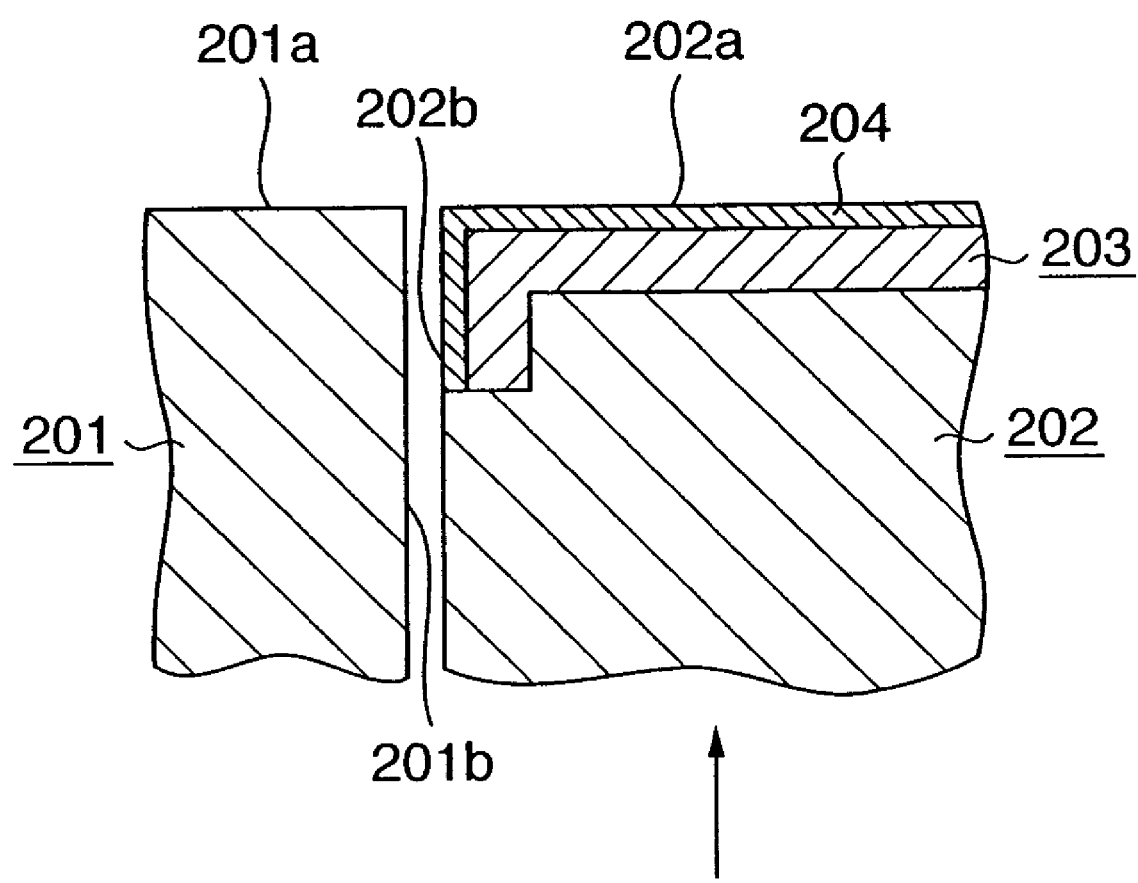
FIG. 12 is a schematic partial sectional view showing an injection mold used in Comparative Example 1.

FIG. 12 is a schematic partial sectional view of an injection mold used in Comparative Example 1. The injection mold of this comparative example has an adjacent member 201 and sliding member 202 adjacent to each other. A sliding surface 202b of the sliding member 202 is slidably guided by a sliding surface 201b of the adjacent member 201 such that a cavity surface 202a of the sliding member 202 protrudes into the cavity by a relative sliding distance from the state in which the cavity surface 202a is leveled with a cavity surface 201a of the adjacent member 201.

A portion from the cavity surface 202a to the sliding surface 202b of the sliding member 202 is continuously coated with a heat insulating coat 203. The range over which the sliding surface 202b is coated with the heat insulating coat 203 is so set as not to exceed the relative sliding distance. In addition, the heat insulating coat 203 extending from the cavity surface 202a to the sliding surface 202b is coated with a protective coat 204.

Figure 13:
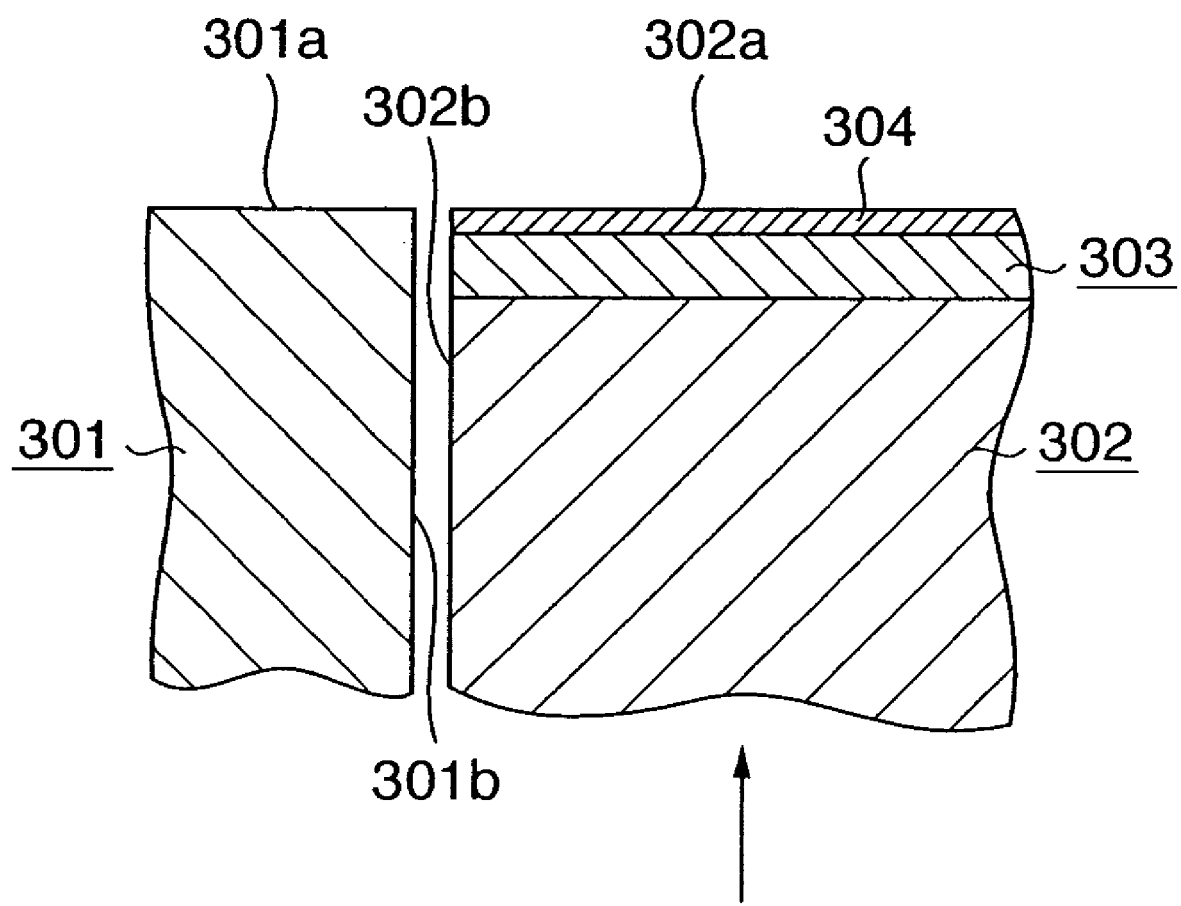
FIG. 13 is a schematic partial sectional view showing an injection mold used in Comparative Example 2.

FIG. 13 is a schematic partial sectional view of an injection mold used in Comparative Example 2. The injection mold of this comparative example has an adjacent member 301 and sliding member 302 adjacent to each other. A sliding surface 302b of the sliding member 302 is slidably guided by a sliding surface 301b of the adjacent member 301 such that a cavity surface 302a of the sliding member 302 protrudes into the cavity by a relative sliding distance from the state in which the cavity surface 302a is leveled with a cavity surface 301a of the adjacent member 301.

The cavity surface 302a of the sliding member 302 is coated with a heat insulating member 303. The heat insulating member 303 is also coated with a protective coat 304.

In each of Comparative Examples 1 and 2, the number of times of injection molding before the heat insulating coat peeled was checked following the same procedure as in Examples 1 to 35. The results are shown in FIG. 15.

As shown in FIGS. 14 and 15, in each of Examples 1 to 35, 10,000 times or more of injection molding were necessary before the heat insulating coat peeled, indicating high durability. In contrast, the heat insulating coats peeled when the numbers of times of injection molding were 13 and 122 in Comparative Examples 1 and 2, respectively.

EXPERIMENTAL EXAMPLE 2

The combination of the sliding member (FIG. 8) and the adjacent member (FIG. 1) in Example 11 described above was used to check the number of times of injection molding before the heat insulating coat peeled by changing the material of the protective coat. The results are shown in FIG. 16. Note that electroless plating, physical vapor deposition, and chemical vapor deposition were used as coat formation methods, and thickness of the protective coat was set to 1 µm. As shown in FIG. 16, in each of Examples 37 to 44, 10,000 times or more of injection molding were necessary before the heat insulating coat peeled, indicating high durability.

In each of the above embodiments as described above, the peeling resistance of the heat insulating coat is high, and this improves the durability. Therefore, high-quality injection molded products having excellent outer appearance can be stably molded.

The present invention is not limited to the above embodiments and various changes and modifications can be made within the spirit and scope of the present invention. Therefore, to apprise the public of the scope of the present invention the following claims are made.

What is claimed is:

1. An injection mold comprising a sliding member having a partial cavity surface which forms part of a cavity surface, and an adjacent member having a partial cavity surface which forms part of the cavity surface, a sliding surface of said sliding member being slidably guided by a sliding surface of said adjacent member and linearly movable by a relative sliding distance, where the sliding surface of said adjacent member contacts with the sliding surface of said sliding member at a corner thereof, wherein a portion from the partial cavity surface to the sliding surface of at least one of said sliding member and adjacent member is continuously coated with a heat insulating coat, and a range over which the sliding surface is coated with said heat insulating coat is so set as to exceed an end of the relative sliding distance.

2. An injection mold comprising a sliding member having a partial cavity surface which forms part of a cavity surface, and an adjacent member having a partial cavity surface which forms part of the cavity surface, a sliding surface of said sliding member being slidably guided by a sliding surface of said adjacent member and linearly movable by a relative sliding distance, where the sliding surface of said adjacent member contacts with the sliding surface of said sliding member at a corner thereof, wherein a portion from the partial cavity surface to the sliding surface of at least one of said sliding member and adjacent member is continuously coated with a heat insulating coat, a range over which the sliding surface is coated with said heat insulating coat is so set as to exceed an end of the relative sliding distance, and an entire region from said heat insulating coat to the sliding surface is continuously coated with a protective coat.

3. An injection mold comprising a sliding member having a partial cavity surface which forms part of a cavity surface, and an adjacent member having a partial cavity surface which forms part of the cavity surface, a sliding surface of said sliding member being slidably guided by a sliding surface of said adjacent member and linearly movable by a relative sliding distance, where the sliding surface of said adjacent member contacts with the sliding surface of said sliding member at a corner thereof, wherein a portion from the partial cavity surface to the sliding surface of at least one of said sliding member and adjacent member is continuously coated with a heat insulating coat, and an entire region from said heat insulating coat to the sliding surface is continuously coated with a protective coat.

4. An injection mold comprising a sliding member having a partial cavity surface which forms part of a cavity surface, and an adjacent member having a partial cavity surface which forms part of the cavity surface, a sliding surface of said sliding member being slidably guided by a sliding surface of said adjacent member and linearly movable by a relative sliding distance, where the sliding surface of said adjacent member contacts with the sliding surface of said sliding member at a corner thereof, wherein at least a portion of the partial cavity surface of at least one of said sliding member and adjacent member is continuously coated with a heat insulating coat, and an entire region from said heat insulating coat to the sliding surface is continuously coated with a protective coat.

5. The mold according to claim 3, wherein said protective coat is made of a metal or ceramics.

6. The mold according to claim 4, wherein said protective coat is made of a metal or ceramics.

* * * * *